United States Patent [19]

Culp

[11] Patent Number: 5,786,653
[45] Date of Patent: Jul. 28, 1998

[54] MULTIRESONANT ACTUATOR

[75] Inventor: Gordon W. Culp, Van Nuys, Calif.

[73] Assignee: Rockwell International Corporation, Costa Mesa, Calif.

[21] Appl. No.: 53,814

[22] Filed: Apr. 29, 1993

Related U.S. Application Data

[63] Continuation of Ser. No. 794,109, Nov. 18, 1991, abandoned.

[51] Int. Cl.$^6$ ............................................. H01L 41/08
[52] U.S. Cl. ................................................... 310/323
[58] Field of Search ................................. 310/316, 317, 310/323, 328; 318/116

[56] References Cited

U.S. PATENT DOCUMENTS

| | | | |
|---|---|---|---|
| 4,628,275 | 12/1986 | Skipper | 330/10 |
| 4,686,407 | 8/1987 | Ceperley | 310/323 |
| 4,727,276 | 2/1988 | Izukawa et al. | 310/316 |
| 4,763,776 | 8/1988 | Okumura et al. | 310/323 X |
| 4,857,793 | 8/1989 | Okuno | 310/328 |
| 4,882,500 | 11/1989 | Iijima | 310/323 |
| 4,937,488 | 6/1990 | Fujie et al. | 310/323 |
| 5,041,750 | 8/1991 | Kitani | 310/323 |
| 5,043,621 | 8/1991 | Culp | 310/316 |
| 5,053,669 | 10/1991 | Saeki et al. | 310/323 |

FOREIGN PATENT DOCUMENTS

| | | | |
|---|---|---|---|
| 0162487 | 8/1985 | Japan | 310/323 |

OTHER PUBLICATIONS

Technical Reference EMDUSM-8703 "Ultrasonic Motor," Panasonic Industrial Co., Electric Motor Division of Matsushita Electric Industrial Co., Ltd. Osaka, Japan.

*Primary Examiner*—Mark O. Budd

[57] ABSTRACT

This invention relates to a multiresonant actuator that moves an object with a minimum of rubbing contact thereby reducing to near zero the heat generated by rubbing contact and cutting the energy loss by this effect to near zero. The invention consists of a traveling wave actuator comprising a vibrator (4) having attached transducers (6a–c) fixed to a base. Traveling wave crests (44) are maintained in contact with a positionable object such as rotor (16) by a predetermined normal force. Traveling wave crests (54) passing along the vibrator (4) forcefully move the positionable object (16) by traction (52). Transducers are electrically segmented into groups. The components of each group are connected in electrical parallel but mechanical series. Groups of a transducer are connected in mechanical series. Each group is electromechanically sinusoidally resonated at a unique frequency, phase, and amplitude by a drive signal from a control means. The vibrator thereby propagates traveling waves that have a nonsinusoidal form. A predetermined wave form produces the least rubbing at the traction contact. The predetermined wave form is used in combination with the Fourier Theorem to prescribe the frequency, phase and amplitude of each transducer group. The vibrator nonsinusoidal wave form is the mechanical sum of sinusoidal constituents. The absence of rubbing proffered by nonsinusoidal traveling waves provides high mechanical efficiency. The use of resonance provides a high electrical efficiency, thereby providing a high actuator system efficiency. Embodiments of the device operate essentially cold, in vacuum without welding, and reliably, as there are few and benign modes of degradation therein.

19 Claims, 2 Drawing Sheets

MULTIRESONANT ACTUATOR

This is a continuation of application Ser. No. 07/794,109 filed on Nov. 18, 1991 now abandoned.

BACKGROUND OF THE INVENTION

1. Field of the Invention

The present invention relates to electrical transducers and, in particular, to an actuator that forcefully and efficiently positions an object by dint of electromechanical multiresonance.

2. Description of Related Art

Ultrasonic traveling wave resonant motors, such as those described in Technical Reference EMDUSM-8703 "Ultrasonic Motor," Panasonic Industrial Co., Electric Motor Division of Matsushita Electric Industrial Co., Ltd., Osaka, Japan are in wide use today. In those motors a vibrating traveling wave plate, usually excited by one or two bonded thickness- or extension-mode piezoelectric transducers, has wave crests that elliptically orbit with a net tangential speed in the direction opposite the wave travel. Despite relatively efficient electromechanically resonant drive electronics associated with these motors, the majority of available electrical power is dissipated as heat produced by rubbing at the traction contacts. The sinusoidal (elliptical) motion at the traction contacts rubs throughout all but a minute portion of each traction cycle. The motor therefore quickly gets very hot thus wasting a lot of energy and causing excessive wear on the vibrator and rotor.

The ideal traveling wave motor or actuator proffers a high system efficiency comprising high electrical efficiency in combination with high non-rubbing mechanical efficiency.

SUMMARY OF THE INVENTION

A representative embodiment of the present invention is a traveling wave multiresonant motor comprising a multiresonant vibrator, a movable object such as a rotor, an electrical power source, and a controlling means to direct electricity to a transducer for inducing waves in the vibrator. There is a means of providing a normal force to maintain contact between the object and the vibrator. The vibrator is excited by the transducer to resonate at a multiplicity of frequencies, phases and amplitudes in accordance with Fourier's Theorem in order to produce a mechanical sum vibration having a predetermined nonsinusoidal form of traveling wave appropriate to rubless tractive positioning of the rotor.

DETAILED DESCRIPTION OF THE INVENTION

FIGS. 1–5 provide an introduction to traveling wave monoresonant motors. Monoresonant in the traveling wave motor context is defined as the use of at most one frequency with at least two phases, the phases being applied in any combination of spatial and electrical time-domain distributions, in order to make waves travel. Such motors are described in Technical Reference EMDUSM-8703 "Ultrasonic Motor," Panasonic Industrial Co., Electric Motor Division of Matsushita Electric Industrial Co., Ltd., Osaka, Japan which is hereby incorporated by reference.

Figure 1:
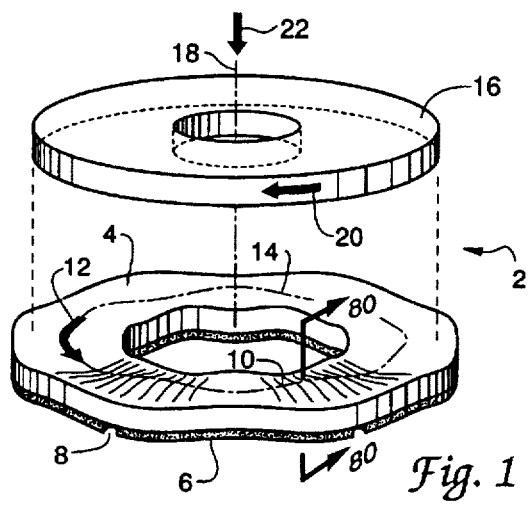
FIG. 1 is a perspective exploded view of a representative monoresonant traveling wave motor.

FIG. 1 shows a perspective exploded view of a monoresonant traveling wave motor 2 comprising vibrator 4 and rotor 16. Vibrator 4 further comprises attached piezoelectric layers 6, typically electrically divided by electrode or full-body gaps 8. Vibrator support, electrical connections and electrical drive means are omitted for clarity. The motor is operable while rotor 16 is rotationally guided about symmetry axis 18 while a predetermined contact force 22 obtains between said rotor and wave crests 10. In response to sinusoidal electrical signals applied to piezoelectric elements 6, vibrator 4 is stimulated into electromechanical resonance that causes traveling waves 10 to circumpropagate vibrator 4 along path 14 in direction 12. Movement of wave crests 10 cause rotor rotation in direction 20.

Figure 2:
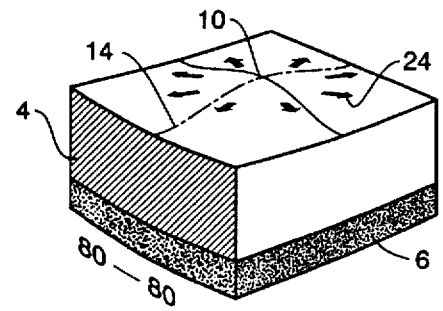
FIG. 2 is a perspective view of a portion of FIG. 1 showing a tension field around a wave crest.

FIG. 2 shows a portion of vibrator 4 in the region of wave crest 10. The wave crest is a deformed portion of vibrator 4 that is convex upward in the figure. Commensurate with the deformation is a tension field illustrated by arrows 24. A half cycle later in space or time, the crest shown will be concave upward in the figure, the tension field having been replaced by a compression field. The stress and strain associated with the deformation is spatially varying in a manner best illustrated by a nested set of equistrain contours, roughly centered about the wave crest. Other than along an equistrain line, the state of surface expansion or contraction, also referred to as dilatation, of any point near the wave crest changes with time and with location.

Figure 3:
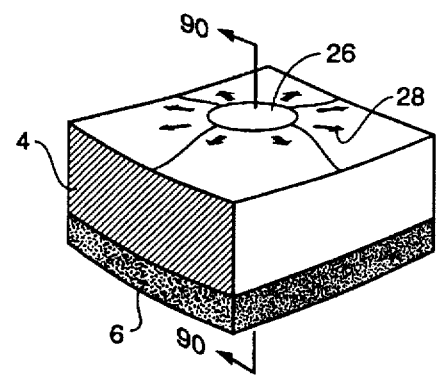
FIG. 3 is the portion of FIG. 2 showing a tension field modified by a tractive wave crest contact.

FIG. 3 illustrates the vibrator portion of FIG. 2 after rotor 16 is brought into forcible contact with wave crest 10, resulting in a deformed contact area 26. The wave crest of the vibrator is partially flattened, while the proximate area of the rotor is partially indented. Partial flattening of the wave crest compresses crest material back into the vibrator body, thereby modifying the tension field 28. The modification complicates the strain distribution by superimposing components of compression on the field of tension.

Figure 4:
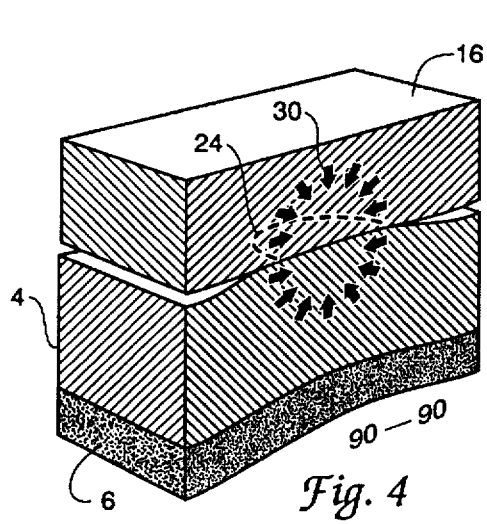
FIG. 4 is a perspective section view of the portion of FIG. 2 showing a compression field in body portions due to tractive contact.

FIG. 4 shows a cross section of the vibrator body portion of FIG. 3, wherein the contact boundary is phantomed with a dashed line 24, and the contact compression field in the bodies of vibrator 4 and rotor 16 is portrayed by arrows 30 (highly simplified in the figure).

Figure 5:
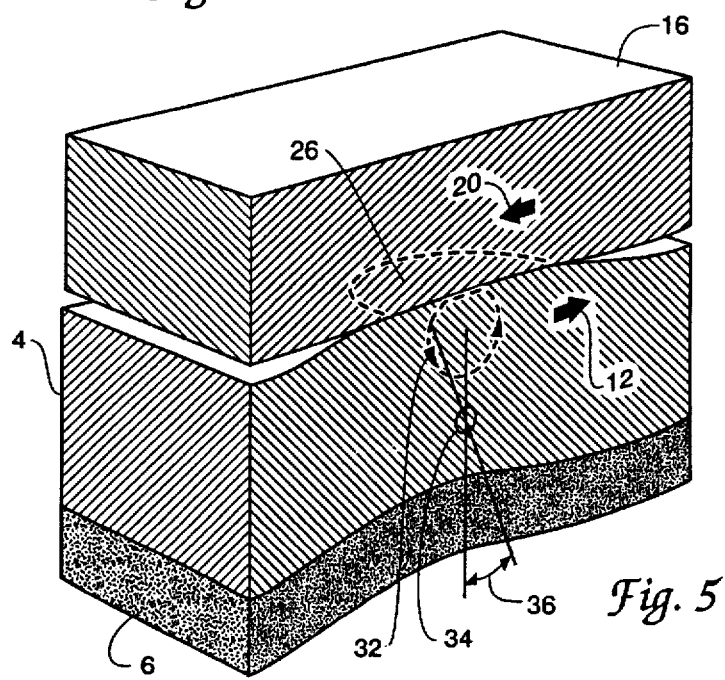
FIG. 5 is an enlarged perspective section view of the portion of FIG. 4 showing nonsinusoidal wave crest motion.

FIG. 5 is an enlarged view of FIG. 4 showing the mechanism of rotor activation. The travel of wave crest contact area 26 in direction 12, by dint of piezoelectric layers 6, causes a portion of the body of vibrator 4 to rotate about a neutral fiber 34 by an angle 36, shown at one instant of time. As a wave passes, the vibrator material in the vicinity of the wave crest follows a truncated elliptical path 32 in the direction indicated by the arrows, resulting in forcible rotation of rotor 16 in direction 20.

Small-area contacts of circular or elliptical shape are adequately described by Hertz. The rigidity of the contact varies as a relatively large exponent of the applied normal force. The pressure distribution about contact area 26, FIGS. 3–5, is roughly parabolic about the center of the contact. However, symmetry of pressure distribution is forfeited when either of the contacting members is undergoing an additional deformation, and when mutual tangential force is borne by the contact. The tension due to deformation of the vibrator near the wave crest causes radially outward sliding. As the wave crest passes a point downstream of the crest, deformation from greater to lesser curvature, or alternatively, from greater to lesser tension, causes sliding in the opposite direction. In short, all but a relatively minute portion of the contacting surfaces slide during the passage of a wave. Many examples of the ultrasonic traveling wave motor frictionally heat their rotors to an uncomfortable temperature after running only a few minutes. These motors have a system efficiency in the neighborhood of 40%, most of the losses being attributable to contact rubbing.

Figure 6:
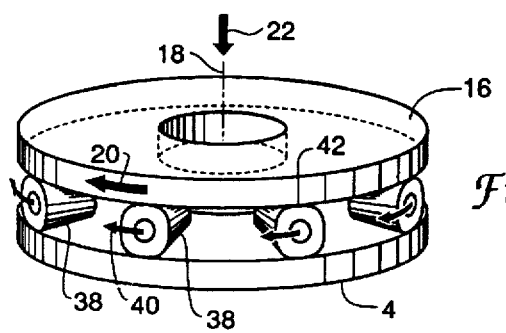
FIG. 6 shows a metaphorical contrivance having ideal mechanical efficiency to be emulated.

FIG. 6 shows a metaphorical device used only to describe the desirable attributes of an ideal traveling wave motor. The metaphorical device comprises a fixed base 4, rollers 38, and rotor 16. Rollers 38 are actuated in direction 40 by an external force. By traction, typically at contacts 42, in combination with externally applied traction normal force 22, rollers cause rotor 16 to rotate in direction 20. Each roller 38 changes its shape in the area proximate contact 42 such that the states of strain in the rotor and the roller are identical, and alternatively, zero, thereby tracting without rubbing. A predetermined deformation of the roller contact surface produces an ideal tractive action on the rotor. In the ideal case where rotor and rollers are made of perfectly rigid material, contact deformation of the Hertz kind does not occur, and a round roller suffices to provide lossless traction to the rotor. With real elastic materials of construction, losses due to contact deformation are eliminated by modifying the curvature of the roller at every portion of the traction contact area such that sliding is avoided. The ideal lossless rolling wheel is thereby replaced by the metaphorical deformed roller. The deformation at the traction contact depends in a complex manner on the elastic and geometric properties of the contacting bodies. As previously described, a "wheel" with a sinusoidal profile cannot provide the deformation necessary to even approach the ideal roller.

Figure 7:
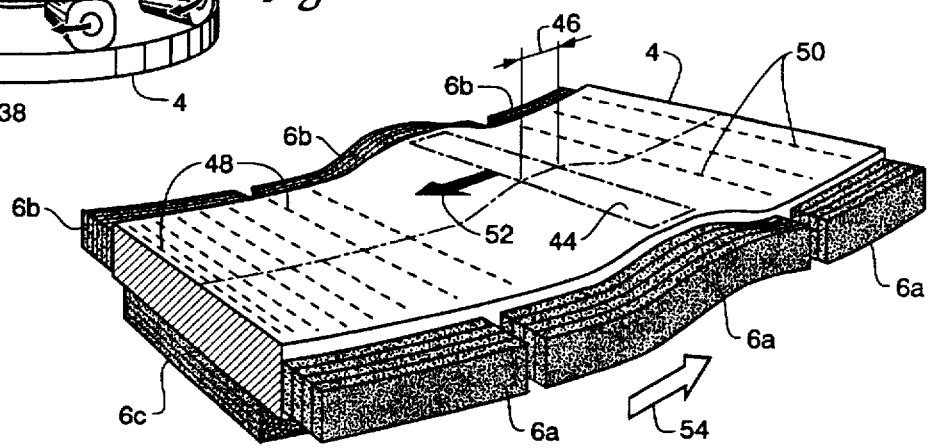
FIG. 7 illustrates a portion of a traveling wave motor having nonsinusoidal wave forms.

FIG. 7 shows a portion of an exemplary embodiment of the present invention comprising multiresonant vibrator 4, having an electromechanical transducer such as shear piezoelectric transducers 6a, 6b, and 6c affixed thereto. Vibrator 4 is supported with constrained rotation and translation, but with freedom to vibrate. Vibrator 4 can be excited by one transducer such as 6c, two transducers such as 6a and 6b or a combination of transducers such as 6a, 6b, 6c to resonate in transverse waves traveling in direction 54, and in longitudinal traveling waves 48, 50 in direction 54. The transverse wave has a crest that has a predetermined flattened profile in the area of contact 44 and may be asymmetric in directions 46. As the wave passes in direction 54, longitudinal wave portion 48 is contracting while longitudinal wave portion 50 is expanding, causing contact area 44 to translate in direction 52, thereby helping to move the rotor (omitted for clarity). The longitudinal wave is nonsinusoidal, helping to translate the contact area 44 in direction 52 so that it proceeds with a constant velocity equal to the surface speed of the rotor at the instant. The behavior of the traveling waves is comparable to the rolling of an ideal tapered roller bearing.

It is to be emphasized that the nonsinusoidal profile of the transverse wave is predetermined to affect the operation of the "ideal wheel," but the ideal wheel, consisting of a constant-radius rotation about its rotary center of the instant, provides no movement of contact area 44 in direction 52. It is therefore necessary to provide a secondary motion, that being the translation in direction 52 provided by the longitudinal traveling wave in this example. Longitudinal net amplitude in the contact region 44 is essentially zero to avoid components of rubbing in directions 46. Therefore, contact area 44 neither shrinks nor expands in directions 46 as it passes a spot on the rotor.

Figure 8:
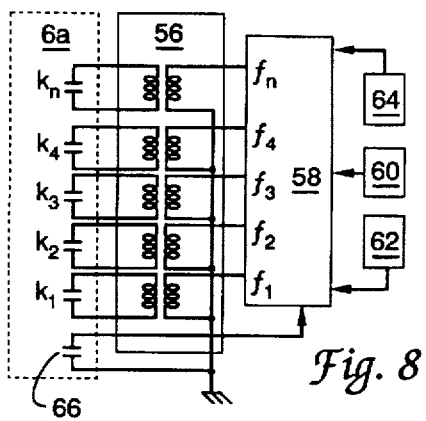
FIG. 8 schematically illustrates a portion of an electrical activation means.

FIG. 8 is a schematic drawing of a portion of the preferred control means comprising at least one transducer 6a, a coupling-stimulating means 56, a control means 58, a source of electrical power 60, and a source of operating command signals 62. Alternative embodiments of the control means further comprise ancillary transducers 64. Each transducer (6 of FIG. 7) is electrically segmented into groups. Each group comprises at least one element that, in the case of the piezoelectric embodiment, represents an electrical capacitance of a predetermined value. Each group may comprise two or more elements in electrical parallel and mechanical series. Each group element is independently electrically addressable. Reactance group elements are symbolized as k1 ... kn in the figure. Each group element is connected in a loop with a portion of coupling-stimulation means 56. In the example of piezoelectric transducers, the coupling means is the inductive secondary of a transformer.

The means for controlling the individual segments are explained in U.S. Pat. No. 4,628,275 issued Dec. 9, 1986 and in U.S. Pat. No. 5,281,899 issued Jan. 25, 1994 which are hereby incorporated by reference.

In operation, control means 58, in response to operating instruction signals 62, distributes electrical power from source 60 to coupling-stimulating means 56 such that each of the k1 ... kn loops is stimulated to resonance. Each loop resonates at a frequency, phase and amplitude predetermined by the control means in accordance with the specific nonsinusoidal profile of the desired traveling wave. Each traveling wave comprises a collection of sinusoidal waves, each wave having an integer number of cycles, a phase, and an amplitude determined by the Fourier Theorem commensurate with the form of a desired wave. The overall traveling wave form is the mechanical sum of its sinusoidal constituents. Mechanical summing is distinguishable from the more conventional electrical Fourier synthesis by the absence of electrical summing. All summing is performed mechanically (excluding electromechanical coupling). Another similar arrangement of the figured control system provides excitation for cooperating nonsinusoidal traveling waves for the example embodiment previously described. The preferred control embodiment uses a combination of position, velocity and acceleration transducers to coordinate two sets of traveling waves so that rotation of the rotor proceeds with advantageously high electromechanical efficiency.

Sensor transducers such as element 66 in FIG. 8 are used to send information about the group to the controller. Sensor transducers for detecting position, velocity and acceleration and the method of smooth walking emulated in this invention are found in U.S. Pat. No. 5,043,621 issued on Aug. 27, 1991 which is hereby incorporated by reference.

Rotation efficiency is a combination of mechanical efficacy and electrical performance. Mechanical efficacy results from reduction or elimination of traction contact rubbing by the use of nonsinusoidal traveling wave forms having profiles predetermined to compensate for contact deformation, wave passage, and other factors previously described that otherwise cause rubbing. The electrical performance of the resonant stimulation of each independently electrically addressable loop is inherently high because the large reactive current oscillating in each loop flows in components having relatively low electrical resistance, for example, capacitors and inductors, rather than through the junctions of solid state output devices of an electrical drive means.

Figure 9:
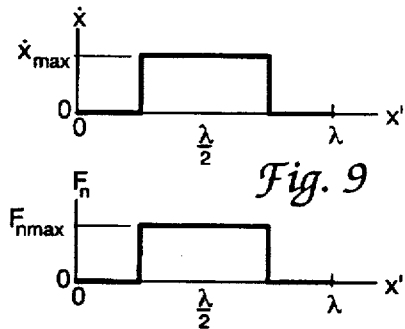
FIG. 9 is a plot of ideal wave velocity past a coordinate point fixed in the rotor.

FIG. 9 is a plot of the velocity of the ideal longitudinal traveling wave of the embodiment shown in FIG. 7 as the wave passes a point in a coordinate system x' fixed in the rotor. Velocity is everywhere zero except inside the traction contact area. Inside the contact area constant velocity prevails. This constant velocity is controlled to be equal to the surface speed of the rotor by minimizing the output of a friction detection means referenced forward. Constant velocity within the traction contact area precludes relative motion between vibrator and rotor that would otherwise cause rubbing.

Figure 10:
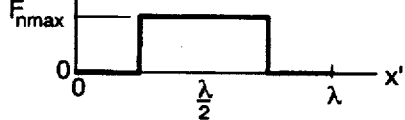
FIG. 10 is a plot of the ideal normal force of contact passing a point fixed in the coordinates of the rotor, and, FIG. 11 plots an example of achieving a constant velocity wave crest by Fourier synthesis.

FIG. 10 is a plot of the normal force of traction contact as a wave passes a point of the rotor having a coordinate system x'. Normal force is zero outside the traction contact area and constant within it. A constant normal force of contact precludes relative motion between rotor and vibrator that otherwise causes rubbing. Avoided causes of rubbing are changes of vibrator curvature and state of tension or compression within the traction contact area.

Figure 11:
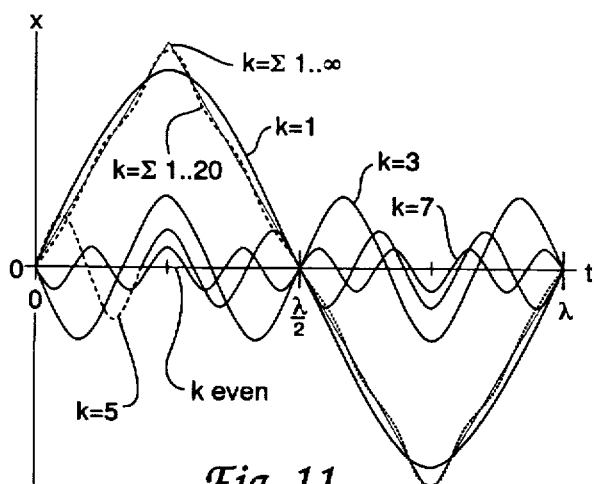

FIG. 11 is a plot of mechanical traveling wave stroke x as a function of time t. The ideal constant-velocity longitudinal wave form is the thin plot line labeled k=1 . . . ∞. The sinusoidal strokes of the k=1 to k=n reactance groups correspond to the capacitor k=1 to k=n groups of FIG. 8. In accordance with Fourier's Theorem, this particular triangular wave form has k-even groups with zero amplitude (no motor torque). The curve k=Σ1 . . . 20, plotted dotted, is the Fourier approximation to the desired triangular wave form using 20 loops (10 of which are active in the absence of torque). The synthesized wave form, using as few as six groups, approximates the ideal wave form well enough to serve a large number of applications. The k-odd loops have negative or positive sines, while the k-even loops have negative or positive cosines. When torque is extracted from the motor, the cosine components become active, their unison-proportional-amplitude (UPA) being adjusted to suit the torque desired. The UPA set of sines is adjusted to vary the speed of the rotor.

Unison-proportional-amplitude is defined as changing the amplitude of each of the frequencies in the group of layers by an amount which is in proportion to the change in the other layers at the same time such that the controller always controls each layer to frequency sum to form the same patterns but of differing amplitudes to increase or decrease the speed and torque of the rotor.

The control means independently adjusts motor speed and delivered torque, while UPA control preserves the profile of the nonsinusoidal wave needed for high mechanical efficiency. UPA control obviates resonance frequency changing difficulties. Nonsinusoidal wave profile results from mechanical summing of sinusoidal wave constituents. High electrical efficiency of resonance is obtained by independently (excluding coupling) resonating electrical loops, each loop having a resistance lower than obtained when a solid state output device was included. The combination of resonance and nonsinusoidal traveling waves results in a relatively high system efficiency. Motors and linear actuator embodiments of the present invention are sufficiently efficient to operate essentially cold while producing full power. The reduction or elimination of traction contact rubbing also allows unlubricated operation in hostile environments such as space vacuum without contact welding. Absence of rubbing prolongs device life because identifiable modes of wear and degradation are few and benign. At low speeds the absence of rubbing due to nonsinusoidal traveling wave forms smoothly moves the rotor.

Measurement of traction contact temperature is particularly important during initial development of the present invention. The method consists of the steps of making rotor and vibrator traction surfaces of thermoelectrically dissimilar materials to form a first thermoelectric junction, closing the loop including the first junction with electrical leads joined to form a second thermoelectric junction, and maintaining the second junction at a known temperature. An electromotive force (emf) results from and is proportional to the temperature difference of the two junctions. Therefore the mean temperature of the set of traction contacts is proportional to the measured emf in the loop in accordance with the Seebeck effect, see Seebeck effect, American Institute of Physics Handbook, 3rd Ed., D. E. Gray, Ed., McGraw-Hill Book Co., New York, 1972 page 9–28.

The ideal embodiment of the present invention produces zero emf. In practice, the repeated application and release of normal force at the traction contacts causes small but measurable heat generation because of the reversible plastic deformation inherent in all materials. However, the generally negligible temperature rise due to reversible plastic deformation is a residual minimum in embodiments of the present invention that properly apply the methods of rubbing minimization herein described. The controller adjusts the waves generated to reduce rubbing based on the temperature measurements.

It is to be understood that within the scope of the present invention, traveling wave activating transducer elements also include electrostrictive, remanent, permeable, magnetostrictive, thermal-expansive, and other materials that provide a forceful shear translation in response to bipolar electrical stimulation as previously described, the piezoelectric shear embodiment being described by way of example.

Figure 12:
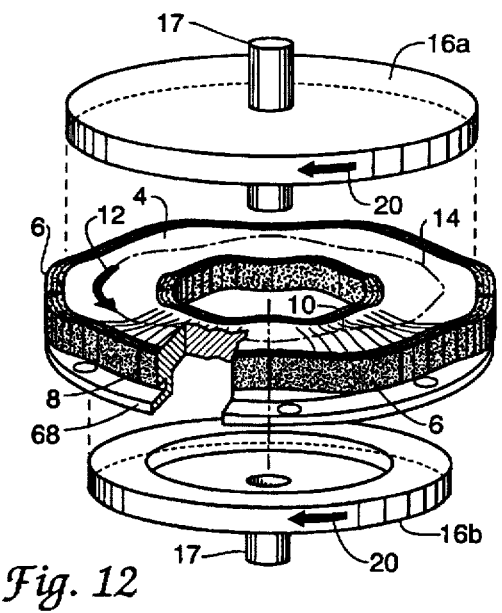
FIG. 12 is a perspective exploded view of a multiresonant traveling wave motor having two rotors.

Fourier synthesis of nonsinusoidal traveling wave forms requires constituents having periodicity and symmetry. Therefore, both sides of a vibrator have the same traveling wave form. An alternate embodiment of the present invention further comprises a second positionable object, for example a rotor, in tractional contact with the wave crests of the opposite wave surface of the vibrator. FIG. 12 shows an exploded view of a variant of the embodiment which mechanically couples the two positionable objects, rotors 16a and 16b, together, for example by a common shaft 17, in order to increase output tangential force. Vibrator 4 uses compressional interference between the two positionable objects to supply the predetermined normal force to the vibrator, thereby obviating a spring means. This constitutes an actuator with free movable objects in the quiescent state, with relatively uninhibited onset of vibrator resonance. Mounting constraint 68 is used to support the vibrator with constrained rotation and translation but with freedom to vibrate.

Although the present invention has been described with respect to specific embodiments thereof, various changes and modifications may be suggested to one skilled in the art. Therefore, it is intended that the present invention encompass such changes and modifications as fall within the scope of the appended claims.

I claim:

1. A multiresonant-traveling wave actuator comprising, a multiresonant vibrator, a movable object, a means of providing a normal force to maintain a contact between the object and the vibrator, a controller to electrically activate an electromechanical transducer, moving the object by traction with negligible contact sliding, the multiresonant vibrator having at least one electromechanical transducer having a plurality of layers of independently electrically addressable segments which receive signals from the controller, wherein the segments mechanically frequency sum to produce waves in the multiresonant vibrator, the waves comprising a longitudinal traveling wave having a contact area component for engaging the object and a velocity component for moving the object at a desired speed.

2. A multiresonant traveling wave actuator as in claim 1 wherein, the electromechanical transducer is a piezoelectric transducer.

3. A multiresonant traveling wave actuator as in claim 2 wherein, the piezoelectric transducer is actuated in the shearing mode.

4. A multiresonant traveling wave actuator as in claim 1 wherein, the vibrator has a top surface, a bottom surface and at least two sides, wherein a transducer is placed on the bottom surface and on two opposing side surfaces.

5. A multiresonant traveling wave actuator as in claim 1 wherein, the vibrator has at least two sides, wherein a transducer is placed on two opposing side surfaces.

6. A multiresonant traveling wave actuator as in claim 1 wherein, the object is a rotor, and the vibrator and the rotor are circular.

7. A multiresonant traveling wave actuator as in claim 1 wherein, the vibrator and the object are linear.

8. A multiresonant traveling wave actuator as in claim 1 wherein, the velocity component of the wave is controlled to match the speed of the object to reduce rubbing contact between the vibrator and the object.

9. A multiresonant traveling wave actuator as in claim 1 wherein, the contact area component of the wave is controlled to obviate dilatation between the vibrator and the object.

10. A multiresonant traveling wave actuator as in claim 6 wherein, the vibrator has a top, a bottom and at least two opposing sides, an electromechanical transducer on each of the two opposing sides, wherein there are two rotors, one rotor opposite the top of the vibrator and one rotor opposite the bottom of the vibrator such that both rotors come in rotational contact with the vibrator at an amplitute that supplies said means of applying a normal force.

11. A multiresonant traveling wave actuator as in claim 10 wherein, the rotors are attached to a common drive shaft passing through the center of the vibrator.

12. A multiresonant traveling wave actuator as in claim 1 wherein, said means of providing a normal force is by the vibrator transducer creating a wave amplitude which extends to make contact with the rotors.

13. A multiresonant traveling wave actuator as in claim 1 wherein, the transducer has sensors for providing information to the controller so as to allow the controller to activate the transducer for optimum performance of the actuator.

14. A multiresonant traveling wave actuator as in claim 13 wherein, the sensors are translation force sensors for determining the force exerted by the vibrator and for determining the position of the vibrator, using the position and force data in the controller to control the vibrator for efficient operation of the actuator.

15. A multiresonant traveling wave actuator as in claim 14 wherein, the unison-proportional-amplitude of the sine components of the waves are adjusted by the controller to obtain the desired speed of the object.

16. A multiresonant traveling wave actuator as in claim 13 wherein, the sensors are normal force sensors for determining the force exerted by the vibrator on the object and using the data in the controller to control the vibrator for efficient operation of the actuator.

17. A multiresonant traveling wave actuator as in claim 16 wherein, the unison-proportional-amplitude of the cosine components of the waves are adjusted by the controller to obtain the desired torque on the object.

18. A multiresonant traveling wave actuator as in claim 13 wherein, the sensors are for determining the temperature of the contact between the object and the vibrator and minimizing the temperature using the controller to control the vibrator for efficient operation of the actuator.

19. A multiresonant traveling wave actuator as in claim 18 wherein, the sensors for determining the temperature of the contact is by making the rotor and vibrator surfaces out of thermoelectrically dissimilar materials to form a first thermoelectric junction, and having a second electric junction of the same materials as the first junction maintained at a known temperature and measuring the electromotive force difference between the two junctions to obtain the temperature of the first junction.

* * * * *